(12) United States Patent
Kim

(10) Patent No.: US 12,050,434 B1
(45) Date of Patent: Jul. 30, 2024

(54) WIDE-AREA QUANTITATIVE PHASE MICROSCOPY USING SPATIAL PHASE SCANNING DIGITAL HOLOGRAPHY

(71) Applicant: UNIVERSITY OF SOUTH FLORIDA, Tampa, FL (US)

(72) Inventor: Myung K. Kim, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 823 days.

(21) Appl. No.: 17/143,826

(22) Filed: Jan. 7, 2021

Related U.S. Application Data

(60) Provisional application No. 63/024,581, filed on May 14, 2020, provisional application No. 62/959,009, filed on Jan. 9, 2020.

(51) Int. Cl.
*G03H 1/04* (2006.01)
*G01B 9/021* (2006.01)
*G03H 1/00* (2006.01)
*G03H 1/08* (2006.01)

(52) U.S. Cl.
CPC ........... *G03H 1/0443* (2013.01); *G01B 9/021* (2013.01); *G03H 1/0005* (2013.01); *G03H 1/0866* (2013.01); *G03H 2001/005* (2013.01); *G03H 2001/0883* (2013.01); *G03H 2226/02* (2013.01)

(58) Field of Classification Search
CPC .... G01B 9/021; G03H 1/0005; G03H 1/0443; G03H 1/0866; G03H 2001/005; G03H 2001/0883; G03H 2226/02
See application file for complete search history.

(56) References Cited

U.S. PATENT DOCUMENTS

| 11,385,450 B2 * | 7/2022 | Kwon | G02B 21/0092 |
| 2009/0128825 A1 * | 5/2009 | Akcakir | G01N 21/6456 |
| | | | 356/457 |
| 2013/0250240 A1 * | 9/2013 | Kim | A61B 3/14 |
| | | | 351/246 |

(Continued)

FOREIGN PATENT DOCUMENTS

CN 110363843 A * 10/2019 ........... G06F 21/602

OTHER PUBLICATIONS

Bianco, V., et al. "Optofluidic holographic microscopy with custom field of view (FoV) using a linear array detector." Lab on a Chip 15.9 (2015): 2117-2124.

(Continued)

*Primary Examiner* — Michael A Lyons
(74) *Attorney, Agent, or Firm* — Quarles & Brady LLP

(57) ABSTRACT

Disclosed are various embodiments for wide-area quantitative phase microscopy using spatial phase scanning digital holography. A motorized micrometer is scanned across a field-of-view, and a camera captures a frame of the field-of-view. The frame of the field-of-view is phase shifted by a predetermined number of pixels. The phase-shifted frame is included in a plurality of phase-shifted frames, and a complex optical field is generated based at least in part on the plurality of phase-shifted frames. A segment of the complex optical field is extracted and appended to a plurality of segments of the complex optical field. A holographic image is generated based at least in part on the plurality of segments of the complex optical field.

25 Claims, 9 Drawing Sheets

(56) References Cited

U.S. PATENT DOCUMENTS

2019/0121292 A1* 4/2019 Kim ..................... G03H 1/0443
2020/0072745 A1* 3/2020 Simpson ................ G02B 21/14

OTHER PUBLICATIONS

Dai, C., et al. "Study of the holographic phase stitching technique." Optical and Digital Image Processing. vol. 7000. International Society for Optics and Photonics, 2008.

Debnath, S. K., et al. "Real-time quantitative phase imaging with a spatial phase-shifting algorithm." Optics letters 36.23 (2011): 4677-4679.

Kemper, B., et al. "Simplified approach for quantitative digital holographic phase contrast imaging of living cells." Journal of biomedical optics 16.2 (2011): 026014.

Pelagotti, A., et al. "An automatic method for assembling a large synthetic aperture digital hologram." Optics Express 20.5 (2012): 4830-4839.

Tahara, T., et al. "Spatial-carrier phase-shifting digital holography utilizing spatial frequency analysis for the correction of the phase-shift error." Optics Letters 37.2 (2012): 148-150.

* cited by examiner

WIDE-AREA QUANTITATIVE PHASE MICROSCOPY USING SPATIAL PHASE SCANNING DIGITAL HOLOGRAPHY

CROSS-REFERENCE TO RELATED APPLICATIONS

This application claims the benefit of and priority to U.S. Provisional Patent Application No. 62/959,009, entitled "WIDE AREA QUANTITATIVE PHASE MICROSCOPY BY SPATIAL PHASE SCANNING DIGITAL HOLOGRAPHY," filed Jan. 9, 2020, and to U.S. Provisional Patent Application No. 63/024,581, entitled "WIDE-AREA QUANTATIVE PHASE MICROSCOPY USING SPATIAL PHASE SCANNING DIGITAL HOLOGRAPHY," filed May 14, 2020, the contents of which are both incorporated by reference herein in their entirety.

BACKGROUND

Digital holographic microscopy provides unique capabilities such as numerical focusing, 3D reconstruction, quantitative phase microscopy, and aberration compensation, to name a few. In digital holographic microscopy, the complex optical field of the light transmitted through or reflected from an object specimen is reconstructed. The phase profile can convey subtle variations in both physical height and material refractive index. Several techniques have been developed to extend the capabilities and applications of digital holographic microscopy. In certain types of applications of microscopy, acquisition of high-resolution images over a large area requires special consideration in order to optimize acquisition and processing speed, size of data set, and complexity of the system. A straightforward and common approach is to translate the object one field-of-view at a time and to stitch together the acquired frames of images. When applied to phase-shifting digital holography, the multiple exposures of each field-of-view requires a stop-and-go motion that can cause problems in the speed, stability, and complexity of the system.

BRIEF DESCRIPTION OF THE DRAWINGS

For a more complete understanding of the embodiments and the advantages thereof, reference is now made to the following description, in conjunction with the accompanying figures briefly described as follows.

DETAILED DESCRIPTION

There is a need for a technique of wide-area quantitative phase microscopy that optimizes the trade-off between speed and resolution. Many existing techniques sacrifice either speed or resolution. For example, the parallel phase shifting method is fast but employs multiple pixels to construct one resolved pixel. This is also true for off-axis holography or Hilbert transform based methods. The latter is sometimes referred to as spatial phase shifting. Another technique, called space-time digital holography, uses a linear sensor or a line of pixels of an area sensor to acquire a series of one-dimensional holograms. The resultant hologram is two-dimensional with unlimited size in the scan direction, but the holographic character is lacking in the scan direction.

Disclosed herein are various examples related to wide-area quantitative phase microscopy using spatial phase scanning digital holography. A system is disclosed that can use a motorized micrometer to linearly scan an object specimen in an interferometer across a tilted reference phase field while acquiring camera frames at regular intervals. Instead of shifting the reference phase itself, the object is scanned across a $2\pi$ phase variation of the reference field. Both the large-area scan and phase shift acquisition are achieved in one sweep. This obviates the need for phase shifting by a piezo-modulator, significantly reduces optomechanical complexity, and allows continuous scanning of a large area of the object.

While the object is scanned across an indefinite length, frames can be captured by a camera and combined into a complex holographic image. An indefinitely long strip of holographic image can therefore be acquired from a single scan. The data acquired using the disclosed system can be processed without the use of fast Fourier transform. And in contrast to techniques discussed above, the disclosed system acquires and processes blocks of phase-shifted interferograms and the resultant wide-field hologram is truly two-dimensional. The disclosed system can be useful in diverse applications like fast scans of blood smears, cell and tissue cultures, and microelectronic surface profiles.

Figure 1:
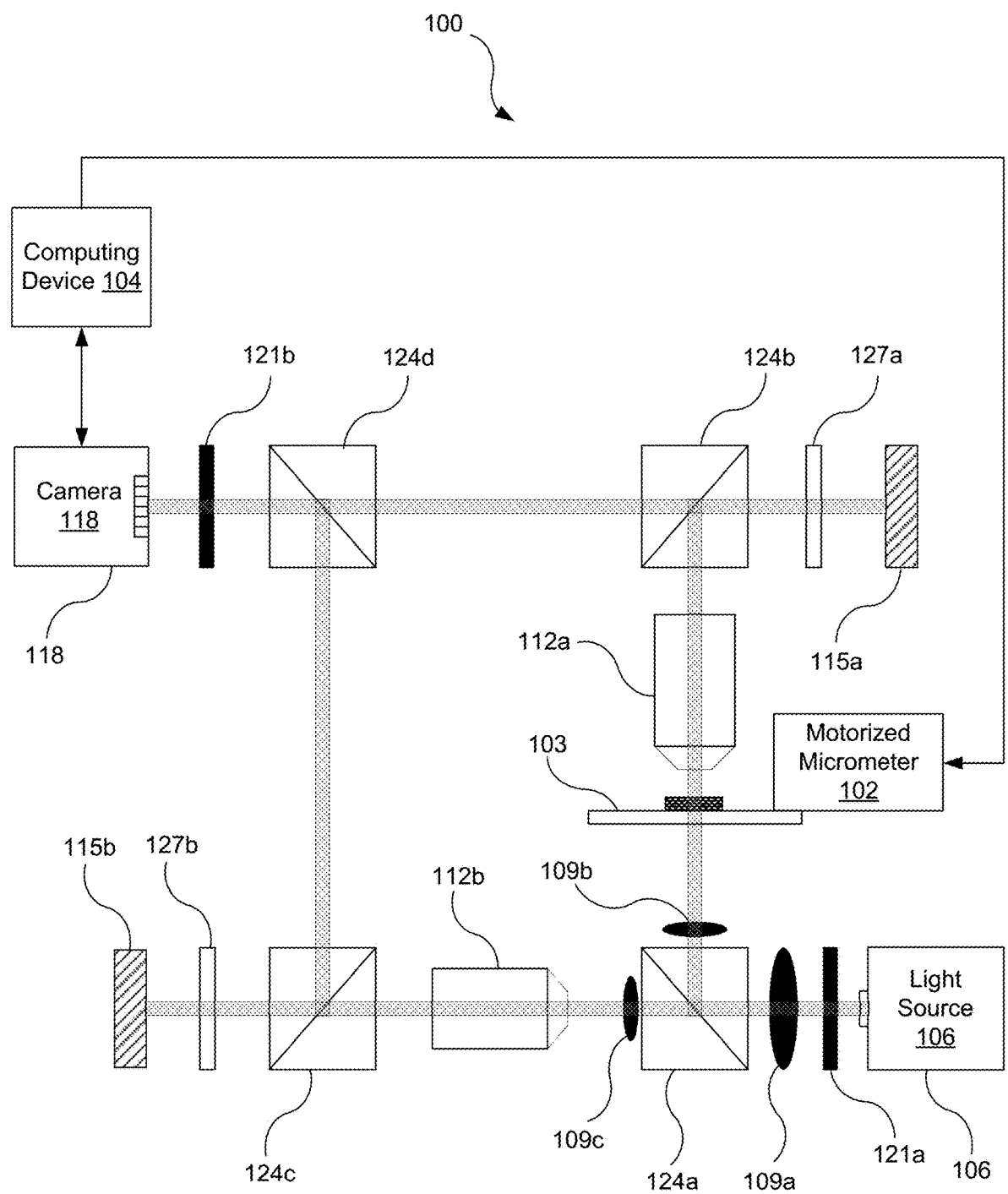
FIG. 1 illustrates an example of a schematic diagram of an apparatus for spatial phase scanning digital holography, according to various embodiments of the present disclosure.

FIG. 1 shows an example of a schematic diagram of a transmission apparatus 100 for spatial phase scanning digital holography. In the example of FIG. 1, the transmission apparatus 100 is based on a Mach-Zehnder interferometer, but in other examples the transmission apparatus 100 can be based on Michelson interferometer. A motorized micrometer 102 can scan an object stage 103 across the x-direction of a field-of-view. The reference can be tilted slightly so that a few fringes are visible across the x-direction. The scan velocity of the motorized micrometer 102 can be controlled by a computing device 104, which can be any suitable computing device as discussed below.

The transmission apparatus 100 can include a light source 106. The light source 106 can be a light-emitting diode or other suitable light source. For example, the light source 106 can be a light-emitting diode with a center wavelength of 625 nm. Using a light-emitting diode instead of a laser can significantly reduce coherent noise while resulting in a need for more careful alignments in some examples. Lenses 109a-c can be used to optimize illumination of the object on the object stage 103.

A pair of microscope objective lenses 112a-b (20×, 0.4 NA) can be inserted in both an object arm and a reference arm of the transmission apparatus 100. The microscope objective lenses 112a-b can be used to carefully match the optical distances and wavefronts of the object and reference arms because of spatial and temporal incoherence of the light source 106. Mirrors 115a-b can also be used for this purpose, with mirror 115a being located on the object arm and mirror 115b being located on the reference arm of the transmission apparatus 100.

The transmission apparatus 100 can also include a camera 118 positioned at an image plane of the transmission apparatus 100. The camera 118 can have, for example, 920×1080 pixels and a 9.68×5.44 $mm^2$ sCMOS sensor area or any other suitable configuration. In some examples, the field-of-view of a single frame can be 285×160 $\mu m^2$ in the object space. The timing of a trigger for the camera 118 can be controlled by the computing device 104. Captures taken by the camera 118 can be stored in a memory of the computing device 104.

The transmission apparatus 100 can further include polarization optics. In some embodiments, these polarization optics can include polarizers 121a-b, polarizing beam splitters 124a-d, and quarter wave plates 127a-b. These polarization optics can help maximize light transmission through the transmission apparatus 100 and balance the object and reference intensities.

Figure 2:
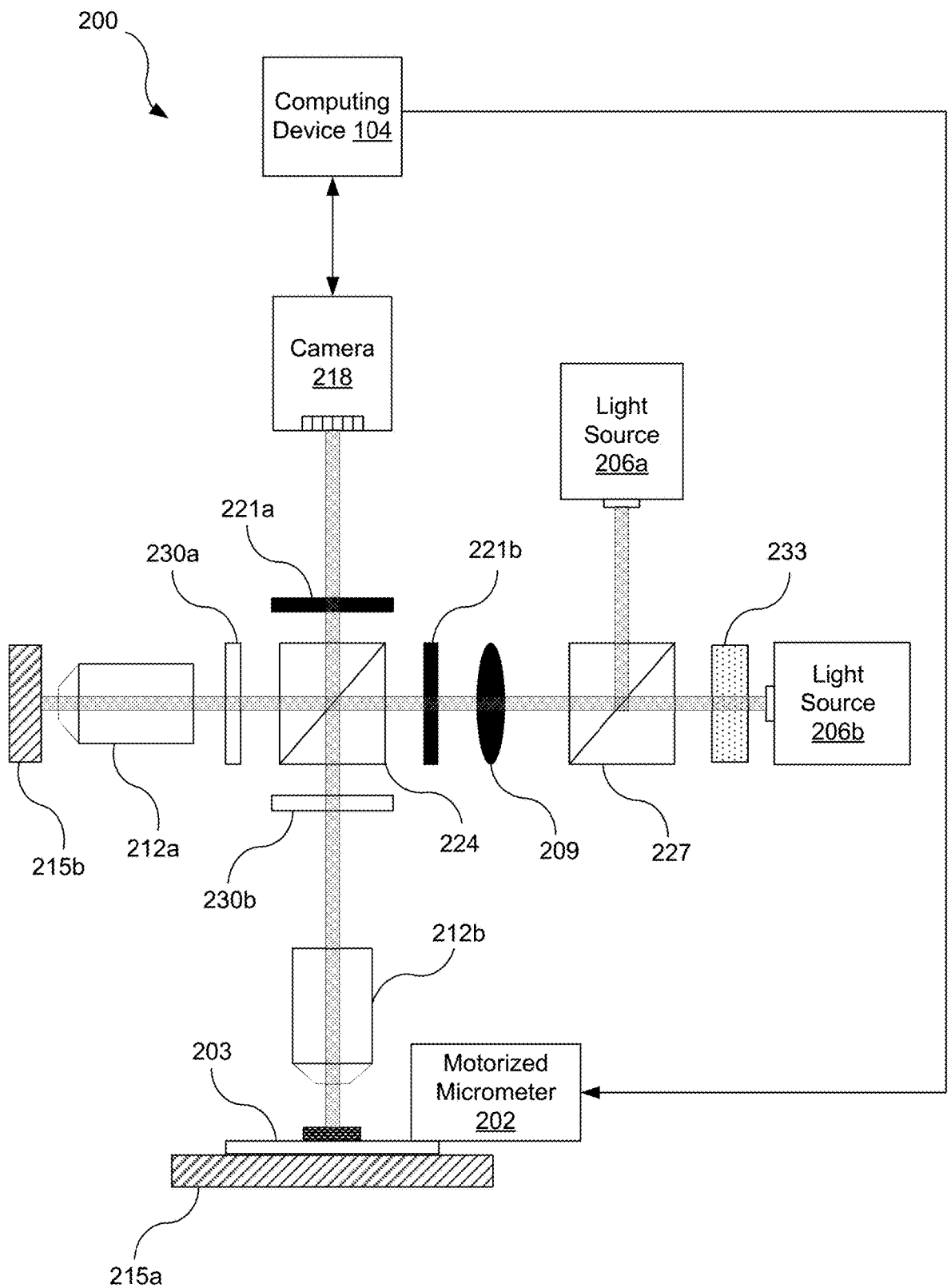
FIG. 2 shows an example of a schematic diagram of a reflection apparatus 200 spatial phase scanning digital holography, according to various embodiments of the present disclosure.

FIG. 2 shows an example of a schematic diagram of a reflection apparatus 200 for spatial phase scanning digital holography. In the example of FIG. 2, the reflection apparatus 200 is based on a Michelson interferometer. A motorized micrometer 202 can scan an object stage 203 across the x-direction of a field-of-view. The reference can be tilted slightly so that a few fringes are visible across the x-direction. The scan velocity of the motorized micrometer 202 can be controlled by the computing device 104, which can be any suitable computing device as discussed below.

The reflection apparatus 200 can include a pair of light sources 206a-b. The light sources 206a-b can be light-emitting diodes, lasers, or any other suitable light sources. The light sources 206a-b can emit light at any suitable wavelength, as can be appreciated. Using multiple light sources 206a and 206b can allow for flexibility in the choice of wavelength. Lens 209 can be used to optimize illumination of the object on the object stage 103.

A pair of microscope objective lenses 212a-b (25×, 0.4 NA) can be inserted in both an object arm and a reference arm of the reflection apparatus 200. In some examples, a slight relative angle can exist between the object arm and the reference arm. The microscope objective lenses 212a-b can be used to carefully match the optical distances and wavefronts of the object and reference arms because of spatial and temporal incoherence of the light sources 206a-b. Mirrors 215a-b can also be used for this purpose, with mirror 215a being located on the object arm and mirror 215b being located on the reference arm of the reflection apparatus 200.

The reflection apparatus 200 can also include a camera 218 positioned at an image plane of the reflection apparatus 200. The camera 218 can have, for example, 920×1080 pixels and a 9.68×5.44 $mm^2$ sCMOS sensor area or any other suitable configuration. In some examples, the field-of-view of a single frame can be 285×160 $\mu m^2$ in the object space. The timing of a trigger for the camera 218 can be controlled by the computing device 104. Captures taken by the camera 218 can be stored in a memory of the computing device 104.

The reflection apparatus 200 can further include polarization optics. In some embodiments, these polarization optics can include polarizers 221a-b, a polarizing beam splitter 224, a beam splitter 227, and quarter wave plates 230a-b. These polarization optics can help maximize light reflection through the reflection apparatus 200 and balance the object and reference intensities.

In addition, the reflection apparatus 200 can include an interference filter 233. The interference filter can be used to narrow a spectral width an increase an interference contract of the reflection apparatus 200.

Figure 3:
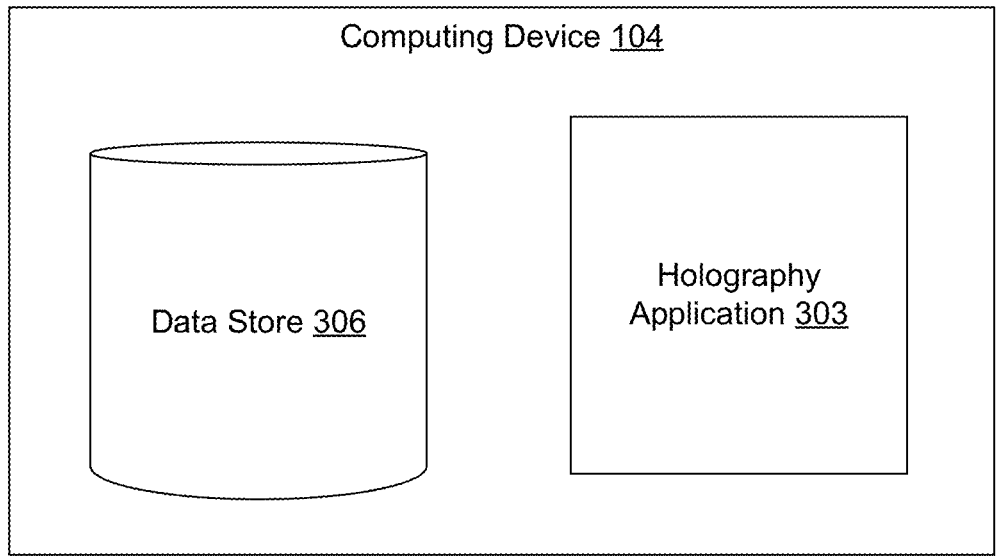
FIG. 3 illustrates an example of a computing device, according to various embodiments of the present disclosure.

FIG. 3 shows an example of a computing device 104. The computing device 104 may include, for example, a server computer or any other system providing computing capability. Alternatively, the computing device 104 may employ a plurality of computing devices that may be arranged, for example, in one or more server banks or computer banks or other arrangements. Such computing devices may be located in a single installation or may be distributed among many different geographical locations. For example, the computing device 104 may include a plurality of computing devices that together may include a hosted computing resource, a grid computing resource or any other distributed computing arrangement. In some cases, the computing device 104 may correspond to an elastic computing resource where the allotted capacity of processing, network, storage, or other computing-related resources may vary over time.

Various applications or other functionality can be executed in the computing device 104 according to various embodiments. The applications executed on the computing device 104 can include, for example, a holography application 303 and other applications, services, processes, systems, engines, or functionality not discussed in detail herein.

Various data can be stored in a data store 306 that is accessible to the computing device 104. The data store 306 may be representative of a plurality of data stores 306, which may include relational databases, object-oriented databases, hierarchical databases, hash tables or similar key-value data stores, as well as other data storage applications or data structures. The data stored in the data store 306 is associated with the operation of the various applications or functional entities described below.

The holography application 303 can be executed to perform wide-area quantitative phase microscopy using spatial phase scanning digital holography. The holography application 303 can perform the operations described herein when the computing device 104 is implemented in either the transmission apparatus of FIG. 1 or the reflection apparatus of FIG. 2.

For example, in either the transmission apparatus 100 or the reflection apparatus 200, the holography application 303 can communicate with a motorized micrometer 102 or 202 to cause the motorized micrometer 102 or 202 to scan across a field-of-view. The holography application 303 can then communicate with the camera 118 or 218 to cause the camera 118 or 218 to capture a frame of the field-of-view and then store the frame in the data store 306. The holography application 303 can phase shift the frame captured by the camera 118 or 218 by a predetermined number of pixels and include the phase-shifted frame in a plurality of phase-shifted frames of the field-of-view that were previously captured by the camera 118 or 218 and stored in the data store 306. The holography application 303 can then generate a complex optical field based at least in part on the plurality of phase-shifted frames. The holography application 303 can store the complex optical field in the data store 306.

The holography application 303 can extract a segment from the complex optical field. Once extracted, the holography application 303 can append this segment of the complex optical field to a plurality of segments of the complex optical field that were previously extracted. The holography application 303 can generate a holographic image based at least in part of the plurality of segments of the complex optical field. The holography application 303 can then store this holographic image in the data store 306.

Figure 4:
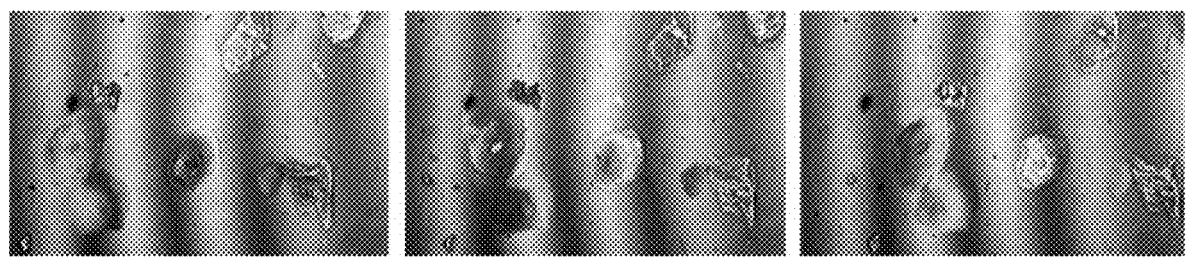
FIG. 4 illustrates examples of camera captures of an object as the object is scanned across a tilted reference field, according to various embodiments of the present disclosure.

FIG. 4 shows examples of captures by the camera 118 as an object is scanned across a tilted reference field in the transmission apparatus 100. These captures include a stationary interference pattern in the background while an object moves across areas of different reference phase. This illustrates the phase shift of each point of the object field by 0, $2\pi/3$, and $4\pi/3$. In some examples, the motorized micrometer 102 can be scanned at a velocity of $V_{scan}$ that is scaled as pixels per second across the x-direction of the field-of-view, the fringe spacing can be $M_{fringe}$ pixels, and the desired number of the phase shift can be $N_{ph}$. In that case, the camera 118 can be triggered at intervals of $T_{cam}$ seconds, which can be give by $$T_{cam} = \frac{M_{fringe}}{N_{ph} \times V_{scan}}.$$

Once a scan begins, a running set of the most recent $N_{ph}$ captures by the camera 118 can be stored in the memory of the computing device 104. In this set of frames, the overall fringe pattern is stationary, but the object points are in motion. To make the object points stationary across these frames, each frame can be x-shifted by $$\frac{n \times M_{fringe}}{N_{ph}},$$

where n is the index in the set of frames. Then the standard phase shift algorithm can be applied to construct a complex optical field given by:

$$E(x, y) = \frac{1}{N_{ph}} \sum_{n=0}^{N_{ph}-1} I_n(x, y) \exp\left(2\pi i \frac{n}{N_{ph}}\right), \quad (1)$$

where $I_n$ represents the properly x-shifted frames of camera captures. From each of the $N_x$ by $N_y$ pixel frame of E(x,y), a segment of $\Delta_x$ by $N_y$ pixels can be retained, where $\Delta_x$ is given by $$\Delta_x = \frac{M_{fringe}}{N_{ph}}.$$

The segment of $\Delta_x$ by $N_y$ pixels can be appended to the set of previous E segments. Doing so allows a holographic image of $N_y$ pixels vertically but of indefinite length horizontally to be created.

The amplitude and phase profiles of the final large area E field are stored in the memory of the computing device 104 as separate files, which can be recalled, viewed, and further processed. Processing of these amplitude and phase profiles can include, for example, numerical focusing and image enhancement.

Figure 5A:
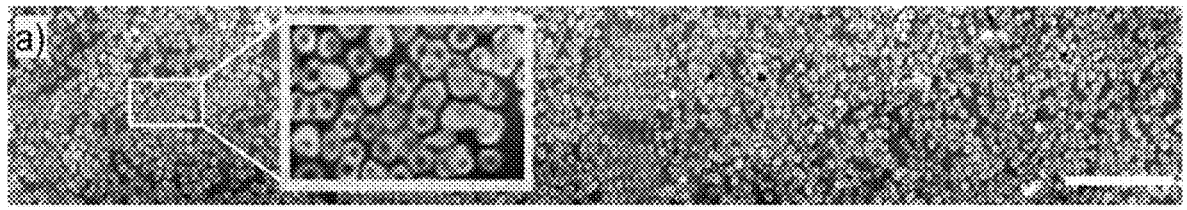
FIGS. 5A-5D illustrate examples of images acquired using spatial phase scanning digital holography, according to various embodiments of the present disclosure.
Figure 5B:
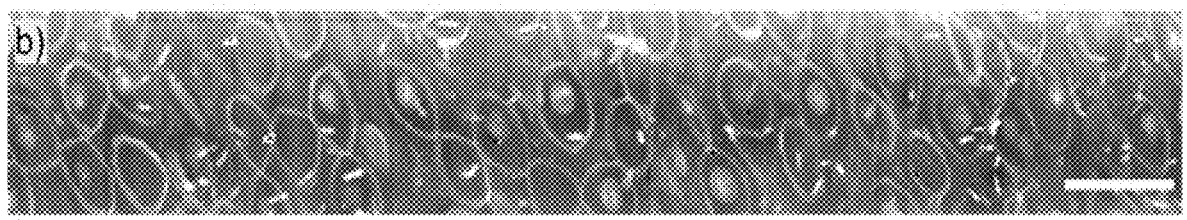
Figure 5C:
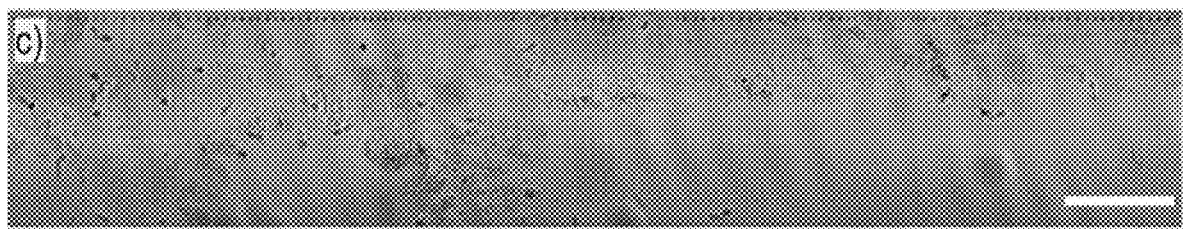

FIGS. 5A-5C shows several examples of images acquired using the transmission apparatus 100. The images show the phase profiles of a physical area of 1090×160 $\mu m^2$ with 7310×1080 pixels. The scale bar is 100 µm. In some examples, the minimum $N_{ph}$ can be three, but in the examples of FIGS. 5A-5C an $N_{ph}$ of ten was used. A larger value for $N_{ph}$ can have some benefit in signal averaging and noise reduction. Examples of values for the other parameters include $V_{scan}$=67 pixels/s and $M_{fringe}$=425.

FIG. 5A shows an example of a phase profile of prepared slides of a human blood smear. A magnified detail of a 40×70 $\mu m^2$ area is also shown as an inset in FIG. 5A. FIG. 5B shows an example of a phase profile of prepared slides of ascaris cells in mitosis. Several cells shown in FIG. 5B display dividing nuclei. The phase profile is proportional to the optical thickness of the structures, so the phase profile is sensitive to subtle changes in refractive index and physical thickness.

Figure 5D:
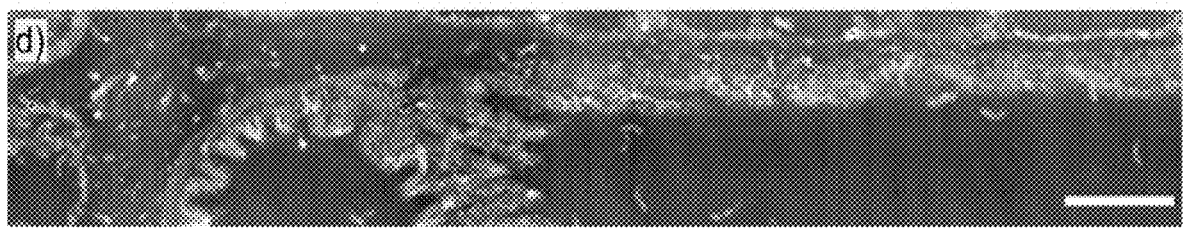

FIG. 5C shows the amplitude profile of a cat lung tissue section, and FIG. 5D shows the phase profile of the cat lung tissue section. Superior contrast of phase image over amplitude image is evident in comparison of FIGS. 5C and 5D. Although the specimen is stained, the tissue structure is easier to discern in the phase image shown in FIG. 5D than in the amplitude image shown in FIG. 5C.

Figure 6:
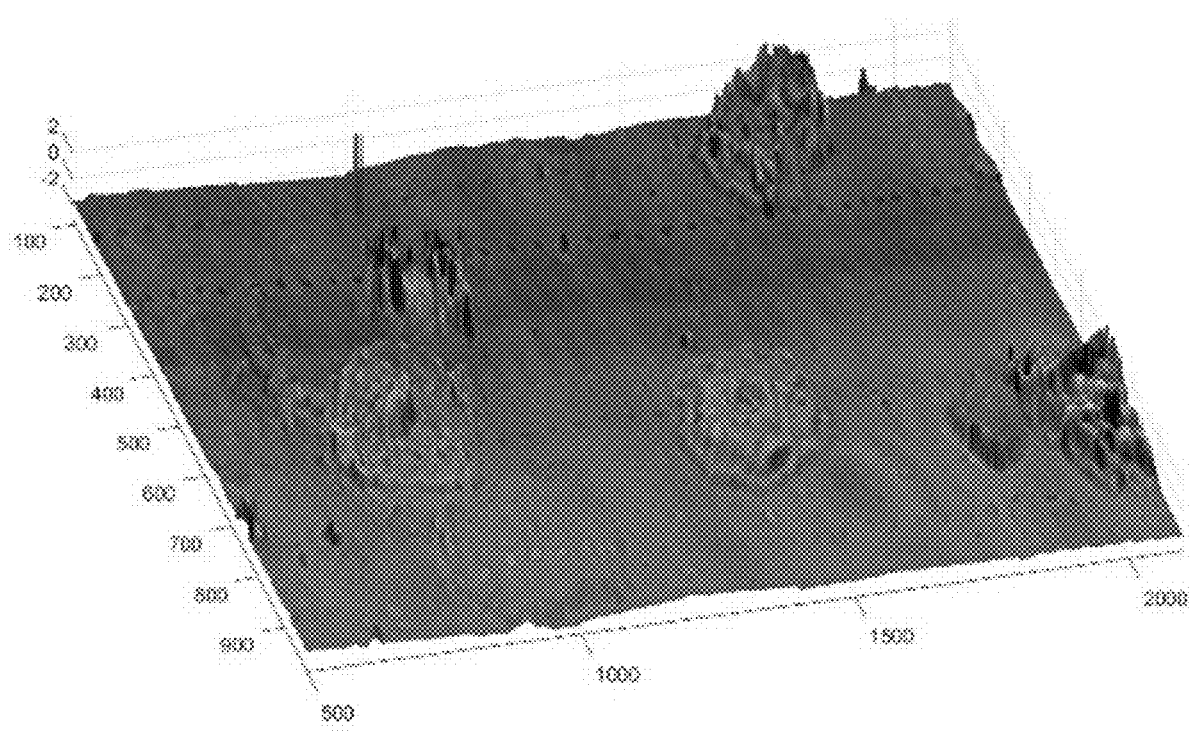
FIG. 6 illustrates an example of a movie of a swab of mouth epithelial cells scanned over a 1090×160 μm area, according to various embodiments of the present disclosure.

FIG. 6 shows an example of a movie of a swab of mouth epithelial cells scanned over a 1090×160 $\mu m^2$ area. The example of FIG. 6 is an alternative rendering of a scanned image that illustrates the movie of the combined amplitude and phase profiles while the object is scanned across. In the example of FIG. 6, the apparent height is proportional to the phase, and therefore to the optical thickness, while the gray scale color map reflects the amplitude of the transmitted object field. The reconstructed hologram has complete three-dimensional information, at least within the coherence length of the light, which can in some examples be some 50 µm for LEDs.

Figure 7:
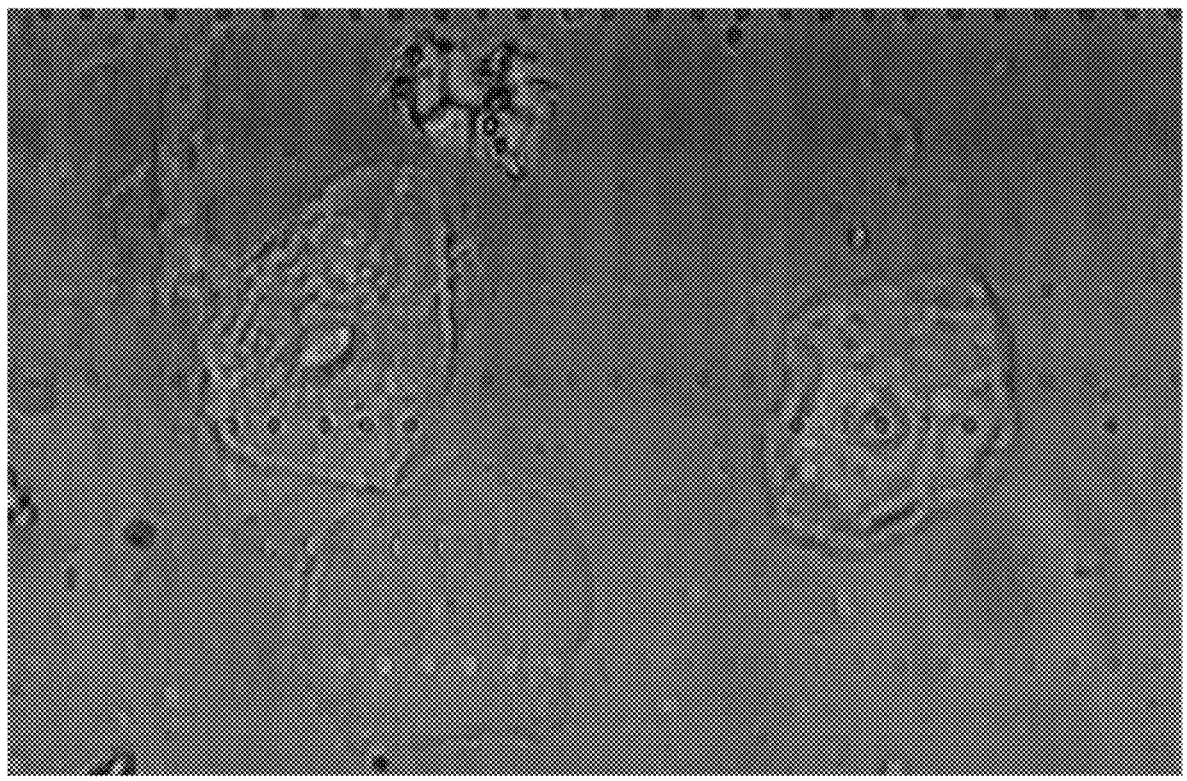
FIG. 7 illustrates an example of a movie of a numerical focusing of an area of an epithelial cell scan, according to various embodiments of the present disclosure.

FIG. 7 shows an example of a movie of numerical focusing on objects at different depts of an area of the epithelial cell scan. In the example of FIG. 7, the amplitude image is re-focused over a range of approximately 100 µm. Different cells and parts of cells come into focus at slightly different focal distances.

A few artifacts are noticeable in images shown in FIGS. 4-7. For example, defect or debris in the optical system can produce a horizontal series of spots. These spots can disappear with careful cleaning of the optics. Also evident is periodic vertical patterns both in amplitude and phase images. This is due to slight errors in calibration of scan speed and camera timing, as well as possible drift of fringes during the scan. An optimized software processing time, for example, can shorten the scan time and reduce the artifact due to system instability. The disclosed optomechanical system acquires approximately 150 frames at 2 fps to generate the images shown in FIGS. 4-7. In examples in which the disclosed optomechanical system has a numerical aperture of 0.4, the disclosed optomechanical system can have a nominal resolution of 0.75 µm. The pixel resolution and the micrometer motional resolution are significantly smaller, providing significant margin of error in the scanning precision. The mechanical stability of the disclosed optomechanical system can lead to fringe drift, which in turn leads to slow phase drift of the holographic image across the scan direction. This turns out to be a source of small but noticeable artifact, which is mostly compensated with a post-processing of the holographic image.

Several variations and extensions for improving performance and for different applications can also be considered. Instead of full-frame camera acquisition, use of region-of-interest (ROI), with a minimum width of one fringe, $M_{fringe}$, can economize memory and processing time. In principle, the sensor pixel count can be minimized by using just $N_{ph}$ lines of pixels placed at intervals of fringe spacing divided by $N_{ph}$, but scanning at a one-pixel distance per exposure. In some examples, the minimum value of $N_{ph}$ can be equal to three. Use of three or more linear array sensors is conceivable for scan of an area large both in width and length. It is also straightforward to apply multi-wavelength optical phase unwrapping for phase images with greater than $2\pi$ of range. For example, two light-emitting diodes with center wavelengths 625 nm and 660 nm can yield phase images with synthetic wavelength given by:

$$\Lambda_{12} = \frac{\lambda_1 \lambda_2}{\lambda_1 - \lambda_2} \quad (2)$$

or 12 μm, much larger than the individual wavelengths. The two light-emitting diodes can be flashed alternately during the scan and processed separately before combining the resultant single-wavelength phase images. A Michelson-type interferometer like in the reflection apparatus 200 can be used for reflection object, such as in surface profile generation.

Figure 8:
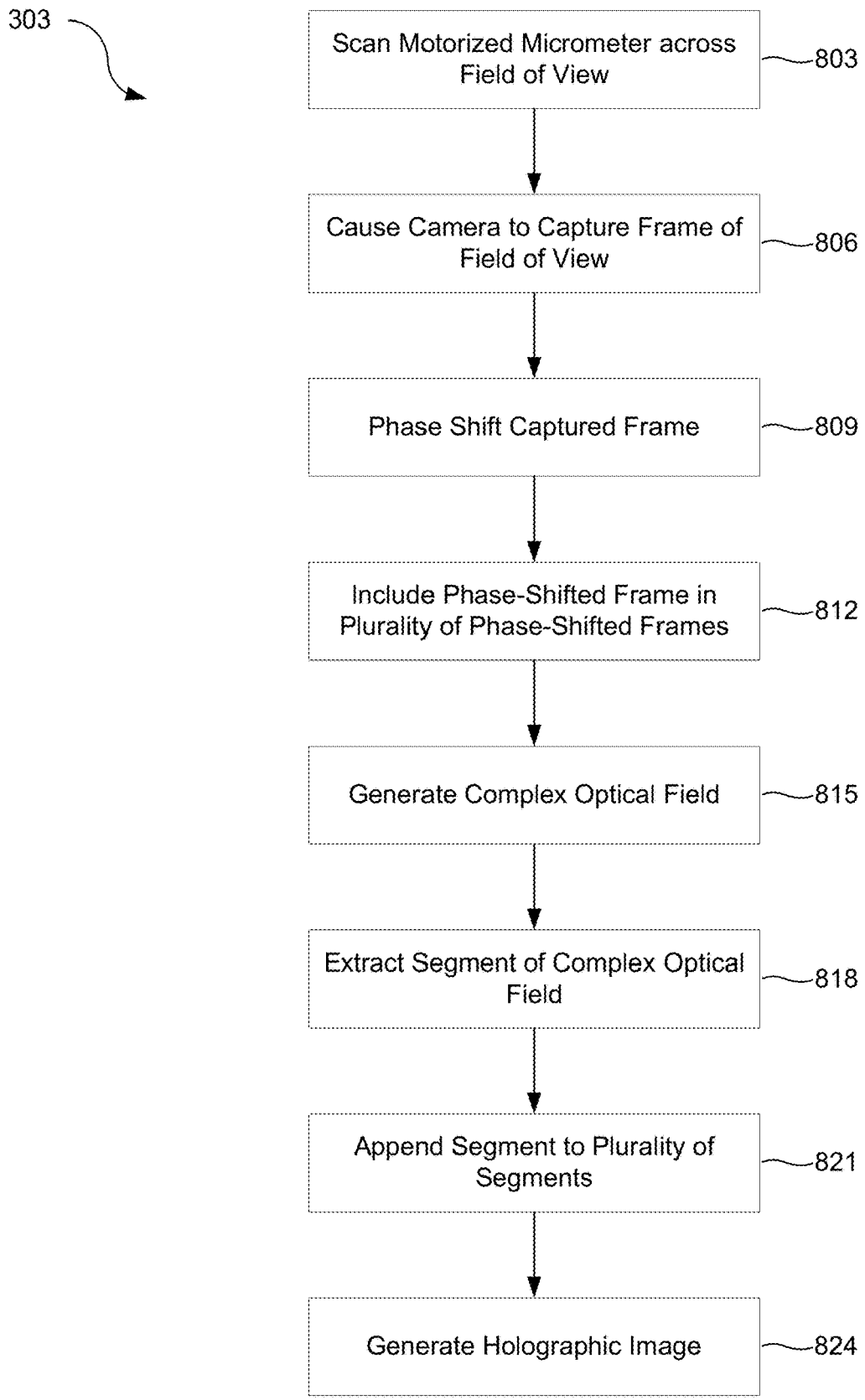
FIG. 8 illustrates an example of a flowchart that provides one example of an operation of a portion of a holography application, according to various embodiments of the present disclosure.

FIG. 8 shows an example of a flowchart that provides one example of an operation of a portion of the holography application 303 when the computing device 104 is implemented in either the transmission apparatus 100 (FIG. 1) or the reflection apparatus 200 (FIG. 2). It is understood that the flowchart of FIG. 8 provides merely an example of the many different types of functional arrangements that may be employed to implement the operation of the portion of the holography application 303 as described herein. As an alternative, the flowchart of FIG. 8 may be viewed as depicting an example of elements of a method implemented in the computing device 104 (FIG. 3) according to one or more embodiments.

At step 803, the holography application 303 can scan the motorized micrometer 102 across a field-of-view. In some examples, the holography application 303 can control a scan velocity at which the motorized micrometer 102 scans across the field-of-view in the transmission apparatus 100. As an alternative, in the reflection apparatus 200, the holography application 303 can scan the motorized micrometer 202 across the field-of-view.

At step 806, the holography application 303 can cause the camera 118 or 218 to capture a frame of the field-of-view, depending on whether the transmission apparatus 100 or the reflection apparatus 200 is used. The holography application 303 can store the frame of the field-of-view in the data store 306. The holography application 303 can include this capture in a running set of most recent captured frames of the field-of-view also stored in the data store 306. In some examples, the frame of the field-of-view can be captured following a predetermined time interval after capturing a previous frame of the field-of-view from the running set of the most recent captured frames. This predetermined time interval can be determined based on, for example, a scan velocity of the motorized micrometer 102, the fringe spacing, and the number of desired phase shifts.

At step 809, the holography application 303 can phase shift the frame of the field-of-view captured by the camera 118 or 218 at step 806. In some examples, the holography application 303 can x-shift the frame by a number of pixels. The number of pixels can be determined based on, for example, a fringe spacing of the field-of-view. As another example, the number of pixels can be based on a number of desired phase shifts.

At step 812, the holography application 303 can include the phase-shifted frame from step 809 in a plurality of phase-shifted frames. In some examples, the plurality of phase-shifted frames can be frames of the field-of-view that were previously captured by the camera 118 or 218 and then stored in the data store 306 and phase shifted by the holography application 303.

At step 815, the holography application 303 can generate a complex optical field based on the plurality of phase-shifted frames. For example, the holography application 303 can apply a phase shift algorithm to the plurality of phase-shifted frames to construct the complex optical field. The holography application 303 can store the complex optical field in the data store 306.

At step 818, the holography application 303 can extract a segment of the complex optical field. In some examples, this segment of the complex optical field can have a width that is based on the fringe spacing and the number of desired phase shifts. The holography application 303 can retain this segment and store the segment in the data store 306.

At step 821, the holography application 303 can append the segment of the complex optical field extracted at step 818 to a plurality of segments. This plurality of segments can be stored in the data store 306.

At step 824, the holography application 303 can generate a holographic image based on the plurality of segment stored in a memory of the holography application 303. In some examples, a length of the holographic image can be based on a number of the plurality of segments. The holographic image can be stored in the data store 306. Operation of the portion of the holography application 303 can then end.

Figure 9:
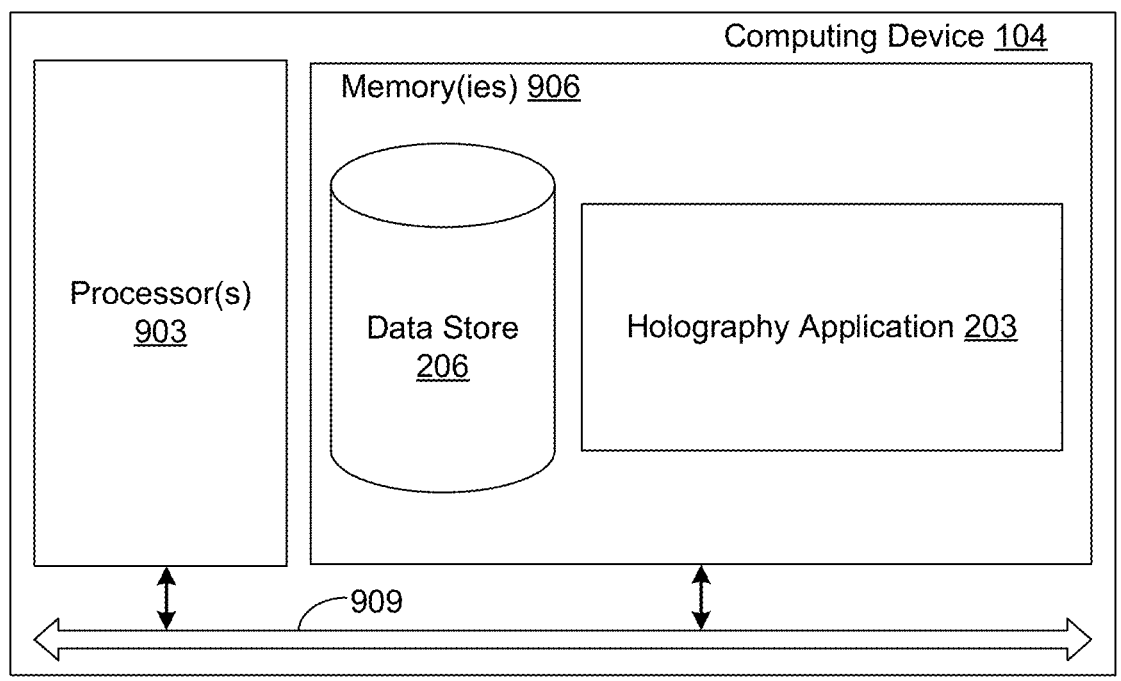
FIG. 9 illustrates an example of a schematic block diagram that provides one example of the computing device of FIG. 3, according to various embodiments of the present disclosure.

FIG. 9 shows an example of a schematic block diagram of the computing device 104. The computing device 104 includes at least one processor circuit, for example, having a processor 903 and a memory 906, both of which are coupled to a local interface 909. To this end, the computing device 104 may include, for example, at least one server computer or like device. The local interface 909 may include, for example, a data bus with an accompanying address/control bus or other bus structure as may be appreciated.

Stored in the memory 906 are both data and several components that are executable by the processor 903. In particular, stored in the memory 906 and executable by the processor 903 are the holography application 303 and potentially other applications. Also stored in the memory 906 may be a data store 306 and other data. In addition, an operating system may be stored in the memory 906 and executable by the processor 903.

It is understood that there may be other applications that are stored in the memory 906 and are executable by the processor 903 as may be appreciated. Where any component discussed herein is implemented in the form of software, any one of a number of programming languages may be employed such as, for example, C, C++, C#, Objective C, Java®, JavaScript®, Perl, PHP, Visual Basic©, Python®, Ruby, Flash®, or other programming languages.

A number of software components are stored in the memory 906 and are executable by the processor 903. In this respect, the term "executable" means a program file that is in a form that may ultimately be run by the processor 903. Examples of executable programs may be, for example, a compiled program that may be translated into machine code in a format that may be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 903 may represent multiple processors 903 or multiple processor cores and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906. The local interface 909 may include additional systems designed to coordinate this communication, including, for example, performing load balancing. The processor 903 may be of electrical or of some other available construction.

Although the holography application 303 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 8 shows the functionality and operation of an implementation of a portion of the holography application 303. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 903 in a computer system or other system. The machine code may be converted from the source code through various processes. For example, the machine code may be generated from the source code with a compiler prior to execution of the corresponding application. As another example, the machine code may be generated from the source code concurrently with execution with an interpreter. Other approaches may also be used. If embodied in hardware, each block may represent a circuit or a number of interconnected circuits to implement the specified logical function or functions.

Although the flowchart of FIG. 8 shows a specific order of execution, it is understood that the order of execution may differ from that which is depicted. For example, the order of execution of two or more blocks may be scrambled relative to the order shown. Also, two or more blocks shown in succession in FIG. 8 may be executed concurrently or with partial concurrence. Further, in some embodiments, one or more of the blocks shown in FIG. 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including holography application 303, that includes software or code may be embodied in any non-transitory computer-readable medium for use by or in connection with an instruction execution system such as, for example, a processor 903 in a computer system or other system. In this sense, the logic may include, for example, statements including instructions and declarations that may be fetched from the computer-readable medium and executed by the instruction execution system. In the context of the present disclosure, a "computer-readable medium" may be any medium that may contain, store, or maintain the logic or application described herein for use by or in connection with the instruction execution system.

The computer-readable medium may include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the holography application 303, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 104, or in multiple computing devices in the same computing device 104.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that do not negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

Therefore, at least the following is claimed:

1. A method, comprising:
   scanning, by a computing device, a motorized micrometer across a field-of-view;
   causing, by the computing device, a camera to capture a frame of the field-of-view;
   phase shifting, by the computing device, the frame by a number of pixels, the number of pixels being based at least in part on a fringe spacing of the field-of-view and a number of desired phase shifts;
   including, by the computing device, the frame in a plurality of phase-shifted frames; and
   generating, by the computing device, a complex optical field based at least in part on the plurality of phase-shifted frames.

2. The method of claim 1, further comprising:
   extracting, by the computing device, a segment of the complex optical field having a width that is based at least in part on the fringe spacing and the number of desired phase shifts;
   appending, by the computing device, the segment to a plurality of segments stored in a memory of the computing device; and
   generating, by the computing device, a holographic image based at least in part on the plurality of segments.

3. The method of claim 2, wherein a length of the holographic image is based at least in part on a number of the plurality of segments.

4. The method of claim 2, further comprising:
   generating, by the computing device, an amplitude profile of the holographic image; and
   processing, by the computing device, the amplitude profile using at least one of numerical focusing and image enhancement.

5. The method of claim 4, further comprising storing, by the computing device, the amplitude profile in a memory accessible to the computing device.

6. The method of claim 1, wherein the computing device causes the camera to capture the frame of the field-of-view at a predetermined time interval following a capture of a previous frame of the field-of-view.

7. The method of claim 6, wherein the predetermined time interval is based at least in part on a scan velocity of the motorized micrometer, the fringe spacing, and the number of desired phase shifts.

8. The method of claim 1, wherein the number of desired phase shifts includes a minimum of three phase shifts.

9. A system, comprising:
   a computing device comprising a processor and a memory; and
   machine-readable instructions stored in the memory that, when executed by the processor, cause the computing device to at least:
   scan a motorized micrometer across a field-of-view;
   cause a camera to capture a frame of the field-of-view;
   phase shift the frame by a number of pixels, the number of pixels being based at least in part on a fringe spacing of the field-of-view and a number of desired phase shifts;
   include the frame in a plurality of phase-shifted frames; and
   generate a complex optical field based at least in part on the plurality of phase-shifted frames.

10. The system of claim 9, wherein the machine-readable instructions, when executed by the processor, further cause the computing device to at least:
    extract a segment of the complex optical field having a width that is based at least in part on the fringe spacing and the number of desired phase shifts;
    append the segment to a plurality of segments stored in a memory of the computing device; and
    generate a holographic image based at least in part on the plurality of segments.

11. The system of claim 10, wherein a length of the holographic image is based at least in part on a number of the plurality of segments.

12. The system of claim 10, wherein the machine-readable instructions, when executed by the processor, further cause the computing device to at least:

generate a phase profile of the holographic image; and
process the phase profile using at least one of numerical focusing and image enhancement.

13. The system of claim 12, wherein the machine-readable instructions, when executed by the processor, further causes the computing device to at least store the phase profile in a memory accessible to the computing device.

14. The system of claim 9, wherein the computing device causes the camera to capture the frame of the field-of-view at a predetermined time interval following a capture of a previous frame of the field-of-view.

15. The system of claim 14, wherein the predetermined time interval is based at least in part on a scan velocity of the motorized micrometer, the fringe spacing, and the number of desired phase shifts.

16. The system of 9, wherein the number of desired phase shifts includes a minimum of three phase shifts.

17. A non-transitory, computer-readable medium embodying a program executable in at least one computing device, that, when executed, causes the at least one computing device to at least:
scan a motorized micrometer across a field-of-view;
cause a camera to capture a frame of the field-of-view;
phase shift the frame by a number of pixels, the number of pixels being based at least in part on a fringe spacing of the field-of-view and a number of desired phase shifts;
include the frame in a plurality of phase-shifted frames; and
generate a complex optical field based at least in part on the plurality of phase-shifted frames.

18. The non-transitory, computer-readable medium of claim 17, wherein the program, when executed, further causes the at least one computing device to at least:
extract a segment of the complex optical field having a width that is based at least in part on the fringe spacing and the number of desired phase shifts;
append the segment to a plurality of segments stored in a memory of the at least one computing device; and
generate a holographic image based at least in part on the plurality of segments.

19. The non-transitory, computer-readable medium of claim 18, wherein the program, when executed, further causes the at least one computing device to at least:
generate an amplitude profile of the holographic image;
generate a phase profile of the holographic image; and
store the amplitude profile and the phase profile in a data store accessible to the at least one computing device.

20. The non-transitory, computer-readable medium of claim 18, wherein a length of the holographic image is based at least in part on a number of the plurality of segments.

21. The non-transitory, computer-readable medium of claim 17, wherein the at least one computing device causes the camera to capture the frame of the field-of-view at a predetermined time interval following a capture of a previous frame of the field-of-view.

22. The non-transitory, computer-readable medium of claim 21, wherein the predetermined time interval is based at least in part on a scan velocity of the motorized micrometer, the fringe spacing, and the number of desired phase shifts.

23. The non-transitory, computer-readable medium of claim 17, wherein the number of desired phase shifts includes a minimum of three phase shifts.

24. A method, comprising:
scanning, by a computing device, a motorized micrometer across a field-of-view;
causing, by the computing device, a camera to capture a frame of the field-of-view;
phase shifting, by the computing device, the frame by a number of pixels, the number of pixels being based at least in part on a fringe spacing of the field-of-view and a number of predetermined phase shifts;
including, by the computing device, the frame in a plurality of phase-shifted frames; and
generating, by the computing device, a complex optical field based at least in part on the plurality of phase-shifted frames.

25. A system, comprising:
a computing device comprising a processor and a memory; and
machine-readable instructions stored in the memory that, when executed by the processor, cause the computing device to at least:
scan a motorized micrometer across a field-of-view;
cause a camera to capture a frame of the field-of-view;
phase shift the frame by a number of pixels, the number of pixels being based at least in part on a fringe spacing of the field-of-view and a number of predetermined phase shifts;
include the frame in a plurality of phase-shifted frames; and
generate a complex optical field based at least in part on the plurality of phase-shifted frames.

* * * * *